United States Patent

Noguchi

[11] Patent Number: 5,933,673
[45] Date of Patent: Aug. 3, 1999

[54] LENS-FITTED PHOTO FILM UNIT WITH LID TO PREVENT CASSETTE DROPPING FROM CASSETTE CHAMBER

[75] Inventor: Osamu Noguchi, Kanagawa, Japan

[73] Assignee: Fuji Photo Film Co., Ltd., Kanagawa, Japan

[21] Appl. No.: 09/031,537

[22] Filed: Feb. 27, 1998

Related U.S. Application Data

[63] Continuation of application No. 08/641,536, May 1, 1996, Pat. No. 5,754,911.

[30] Foreign Application Priority Data

May 10, 1995 [JP] Japan .................................. 7-111911
Sep. 21, 1995 [JP] Japan .................................. 7-243095

[51] Int. Cl.⁶ .............................................. G03B 17/02
[52] U.S. Cl. ............................................................ 396/538
[58] Field of Search ............................... 396/6, 535, 538, 396/536

[56] References Cited

U.S. PATENT DOCUMENTS

| | | |
|---|---|---|
| 4,832,275 | 5/1989 | Robertson . |
| 4,834,306 | 5/1989 | Robertson et al. . |
| 5,146,255 | 9/1992 | Nakai et al. . |
| 5,271,577 | 12/1993 | Takahashi et al. . |
| 5,407,146 | 4/1995 | Takahashi et al. . |
| 5,526,084 | 6/1996 | Kataoka et al. . |
| 5,664,249 | 9/1997 | Okuno et al. ............................. 396/538 |
| 5,664,250 | 9/1997 | Wakabayashi . |

*Primary Examiner*—Howard B. Blankenship
*Attorney, Agent, or Firm*—Young & Thompson

[57] ABSTRACT

A lens-fitted photo film unit has a photo film roll chamber (131) and a cassette containing chamber (17, 133). The roll chamber contains photo film (18) wound in a form of a roll. The cassette containing chamber contains a cassette (16). The photo film is wound into the cassette as much as one frame each time one frame is exposed. A bottom lid (30, 137) covers a bottom of the cassette containing chamber, and is opened to remove the cassette from the cassette containing chamber with the photo film included therein. A stopper projection (34) prevents the cassette from dropping out of the cassette containing chamber in removal of the cassette after opening the bottom lid. In a preferred embodiment, a hinge portion (30b, 142) connects the bottom lid (30, 137) to a rear cover (138) by way of a single piece and in swingable fashion. The hinge portion is defined by a first groove (146) formed in an obverse face of the rear cover, and a second groove (147) formed in a reverse face of the rear cover. The second groove is parallel with the first groove, and deviated from the first groove in a width direction thereof.

2 Claims, 11 Drawing Sheets

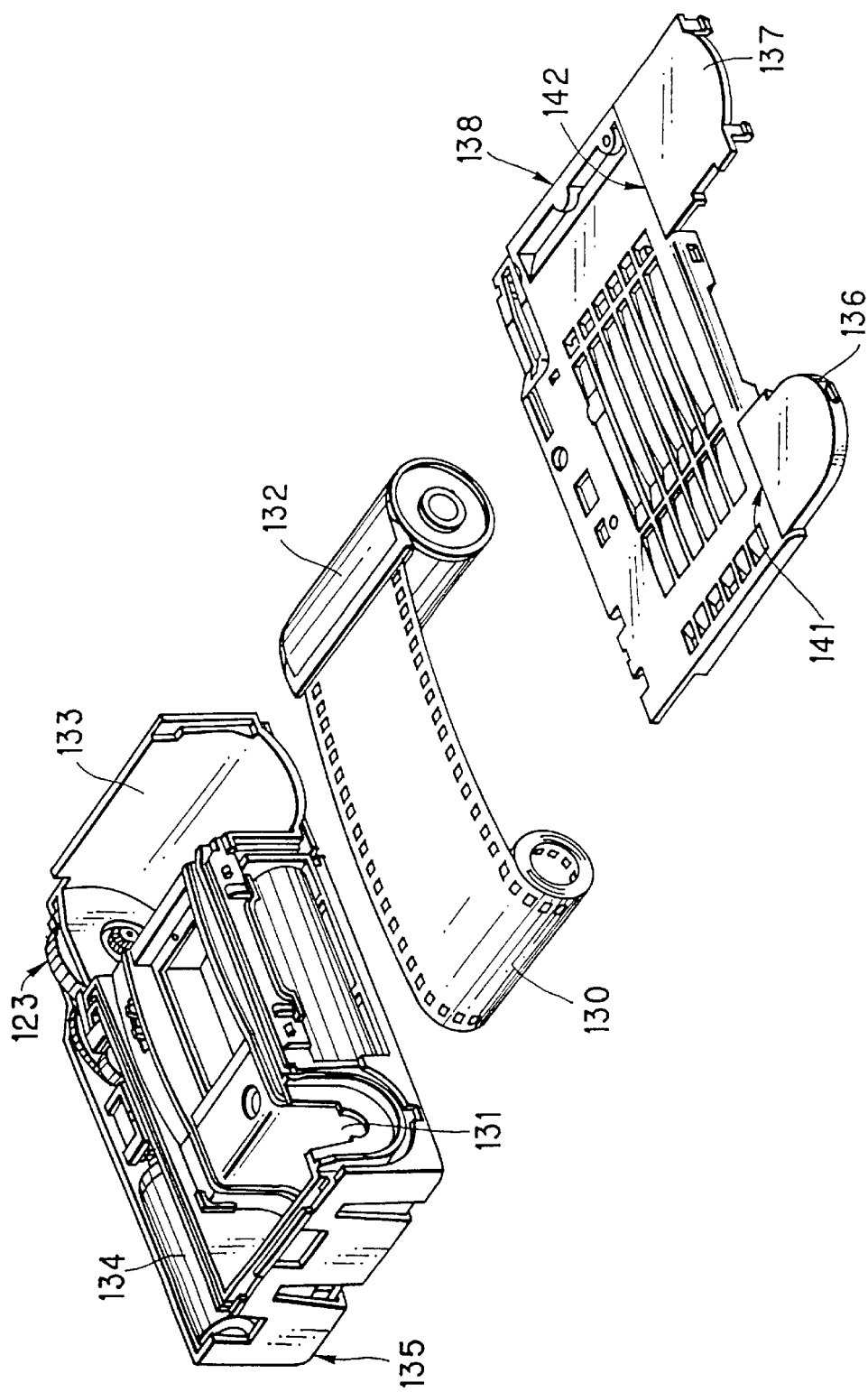

FIG. 12A   FIG. 12B
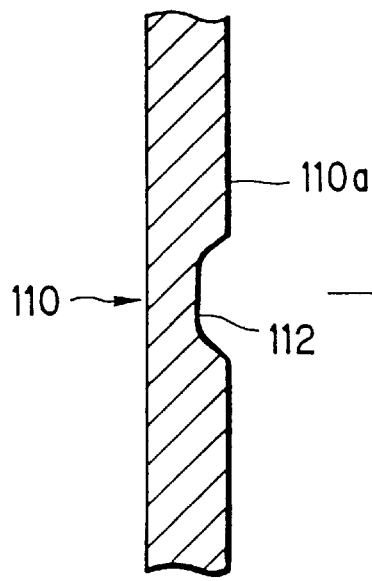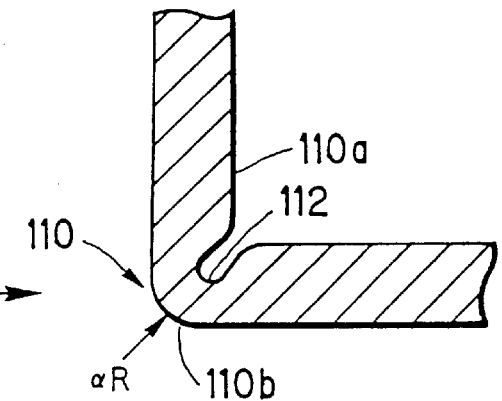
FIG. 13A   FIG. 13B
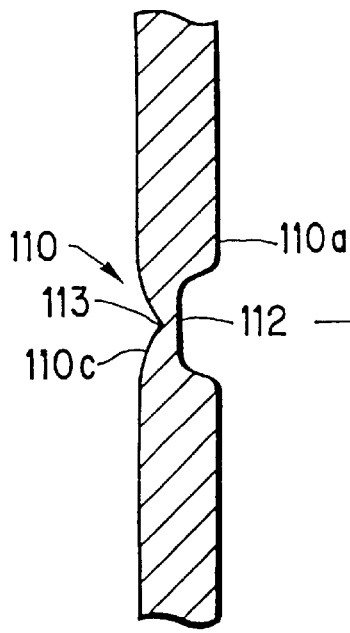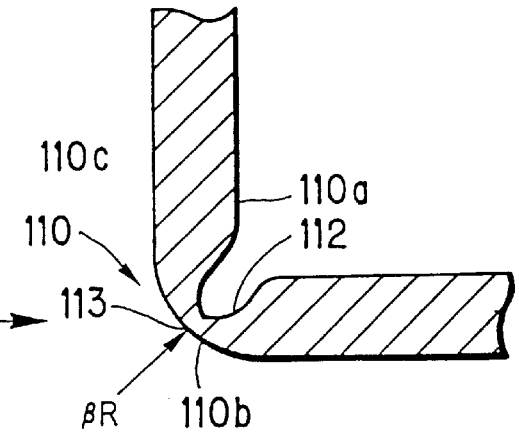

LENS-FITTED PHOTO FILM UNIT WITH LID TO PREVENT CASSETTE DROPPING FROM CASSETTE CHAMBER

This is a continuation of application Ser. No. 08/641,536 filed May 1, 1996, now U.S. Pat. No. 5,754,911 issued May 19, 1998.

BACKGROUND OF THE INVENTION

1. Field of the Invention

The present invention relates to a lens-fitted photo film unit. More particularly, the present invention relates to a lens-fitted photo film unit of which a lid openable for removing a photo film cassette is improved for convenience of treating the cassette.

2. Description Related to the Prior Art

A lens-fitted photo film unit contains a cassette, into which photo film is wound each time an exposure is taken. There is a bottom lid, which is disposed under the cassette to cover a bottom of a cassette containing chamber, and opened to remove the cassette with the photo film from the lens-fitted photo film unit. The cassette has a spool, which has a top end engaged with a shaft portion under a photo film winding wheel.

It requires external operation in a photo laboratory to remove the cassette from the lens-fitted photo film unit even when the bottom lid is opened. This is because the top end of the spool is engaged with the shaft portion of the photo film winding wheel. An operator of the photo laboratory shakes down the lens-fitted photo film unit in the axial direction of the spool for the purpose of detachment of the spool. It is likely that the cassette, when shaken in sufficiently quick motion, is thrown out, striking a wall or floor, and damaged irrecoverably.

A new type of photo film cassette is suggested by U.S. Pat. Nos. 4,834,306 and 4,832,275 and commonly assigned U.S. Pat. Nos. 5,271,577 and 5,407,146 (both corresponding to JP-A 3-37645). A photo film inclusive of a leader is precontained in a cassette shell. Rotation of a spool causes the photo film to advance to the outside of the cassette shell. There is another suggestion in that a cassette shutter is incorporated in a photo film passage port in openable fashion without using a light-trapping fabric, so as to reduce frictional resistance to advancement of the photo film.

It is conceived that a lens-fitted photo film unit, for use with the photo film cassette having the cassette shutter, is provided with a cassette shutter drive mechanism in the cassette containing chamber. When the cassette is loaded, the cassette shutter is open. The engagement of the cassette shutter with the drive mechanism makes it more difficult to remove the photo film cassette from the cassette containing chamber. This is because both the spool and the cassette shutter must be disengaged before removal.

SUMMARY OF THE INVENTION

In view of the foregoing problems, an object of the present invention is to provide a lens-fitted photo film unit of which a photo film cassette can be prevented from being accidentally damaged during removal with exposed photo film.

Another object of the present invention is to provide a lens-fitted photo film unit of which a lid openable for removing a cassette can be prevented from being broken away from a housing of the photo film unit.

In order to achieve the above and other objects and advantages of this invention, a bottom lid covers a bottom of the cassette containing chamber, the bottom lid being opened to remove the cassette from the cassette containing chamber with the photo film included therein. A stopper device prevents the cassette from dropping out of the cassette containing chamber in removal of the cassette after opening the first lid.

In a preferred embodiment, the stopper device stops the cassette from moving down past an halfway position where the cassette partially appears outside the cassette containing chamber. The stopper device is disposed on the bottom lid, and receives a bottom of the cassette in removal with the bottom lid open.

In still a another preferred embodiment, a hinge portion connects the bottom lid to the rear cover by way of a single piece and in swingable fashion, the hinge portion being defined by: a first groove formed in an obverse face of the rear cover; and a second groove formed in a reverse face of the rear cover, substantially in parallel with the first groove, and deviated from the first groove in a width direction thereof.

BRIEF DESCRIPTION OF THE DRAWINGS

The above objects and advantages of the present invention will become more apparent from the following detailed description when read in connection with the accompanying drawings, in which:

FIG. 10 is an exploded perspective illustrating the lens-fitted photo film unit;

FIGS. 12A and 12B are partial sections illustrating a hinge portion having a single groove; and FIGS. 13A and 13B are partial sections illustrating a hinge portion to which a wedge-shaped groove is added.

DETAILED DESCRIPTION OF THE PREFERRED EMBODIMENT(S) OF THE PRESENT INVENTION

Figure 1:
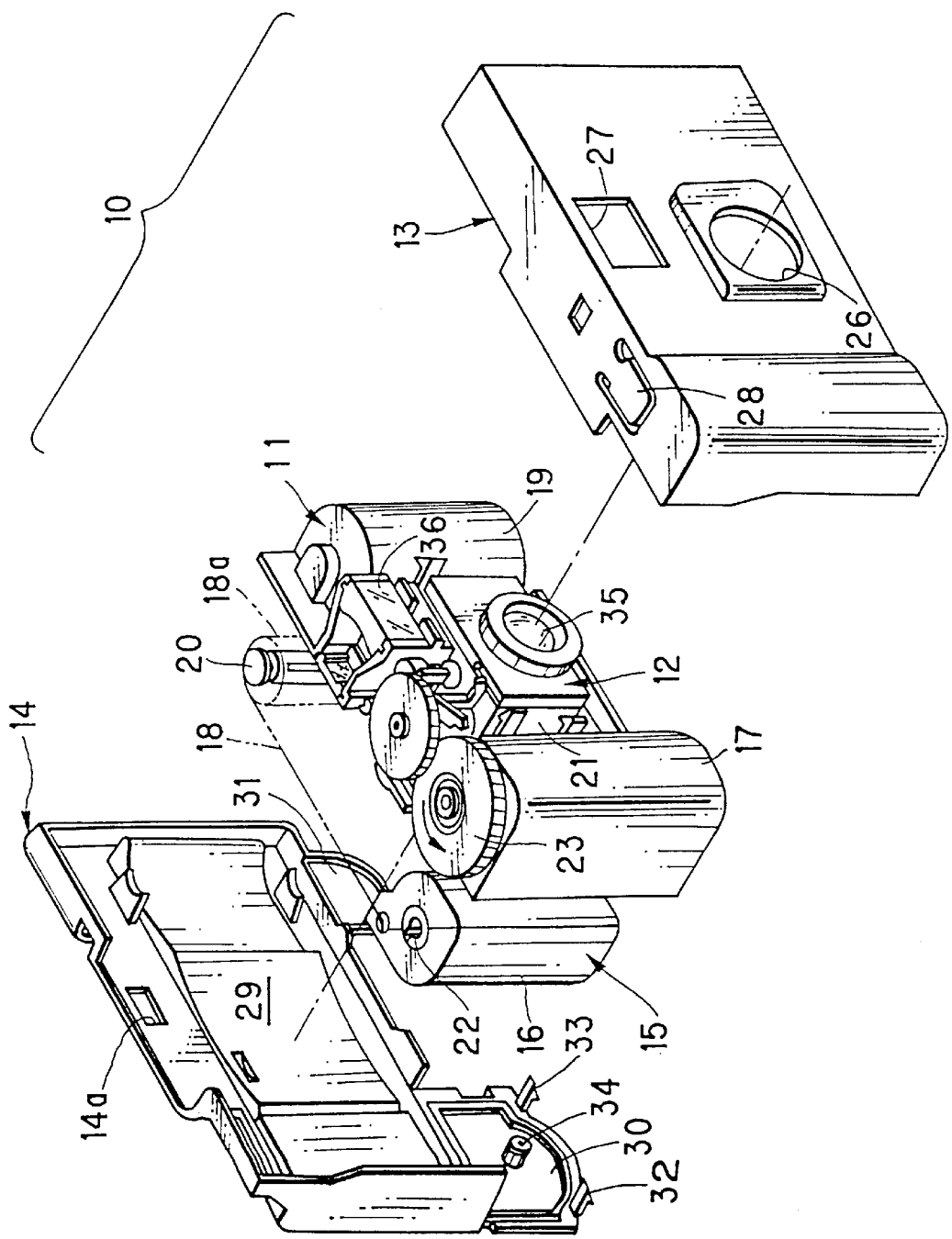
FIG. 1 is an exploded perspective illustrating a lens-fitted photo film unit.

In FIG. 1, a lens-fitted photo film unit 10 includes a photo film containing unit 11, an exposure-taking unit 12, a front cover 13, a rear cover 14 and a cassette photo film 15.

The photo film containing unit 11 has a cassette containing chamber 17 and a photo film roll chamber 19. The cassette containing chamber 17 contains a cassette 16. The roll chamber 19 contains an unexposed photo film 18 drawn from the cassette 16. The photo film 18 is in the form of a roll 18a wound about a shaft 20 disposed in the roll chamber 19 in rotatable fashion. A light-shielding tunnel 21 is located between the cassette containing chamber 17 and the roll chamber 19. It is possible in the present invention to eliminate the shaft 20 in using the roll 18a.

Figure 5:
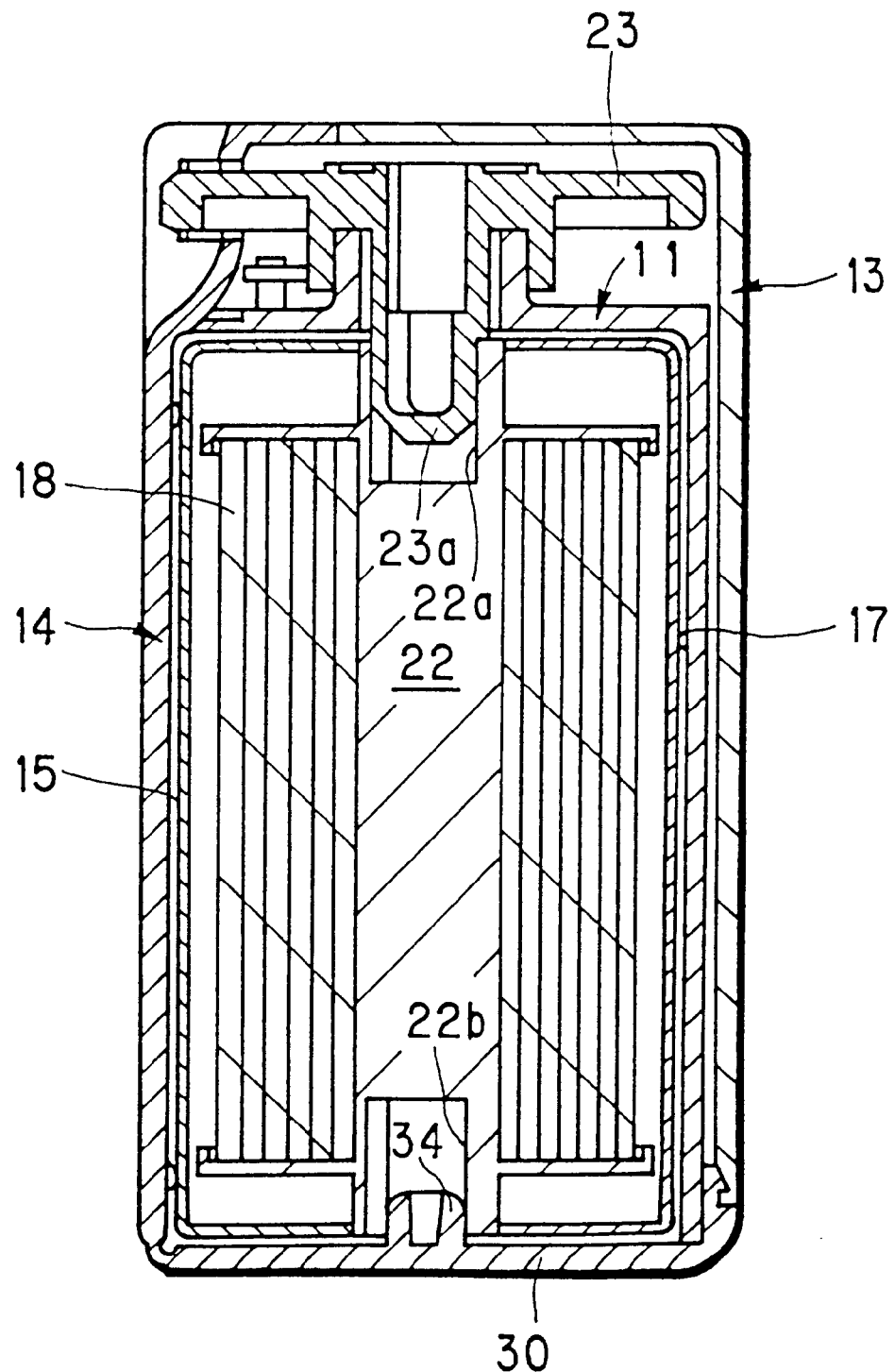
FIG. 5 is a vertical section illustrating a cassette containing chamber with the bottom lid closed.

The cassette photo film 15 is such a type that the photo film 18 is entirely pre-contained in the cassette 16 with a trailer retained on a spool 22, and that rotation of the spool 22 causes the photo film 18 to advance to the outside of the cassette 16. Distal ends of the spool 22 have respective key holes, which emerge in respective end faces of the cassette 16 (See FIG. 5).

In the rear of the light-shielding tunnel 21 is formed an exposure aperture for defining an exposable range of photo film. On the top of the cassette containing chamber 17, a photo film winding wheel 23 is disposed in rotatable fashion. A shaft portion is formed on a bottom of the winding wheel 23, has a key shape as viewed in a section, and is engageable with a key hole in the spool 22 positioned in the cassette containing chamber 17. The winding wheel 23 is rotated in the arrow direction as shown, to rotate the spool 22 in the direction to wind the photo film, for including the photo film 18 into the cassette 16 after exposure.

The front cover 13 has a lens opening 26, a viewfinder objective window 27, a shutter release button 28 and the like formed therein. There is a taking lens directed to an object through the lens opening 26. The rear cover 14 has a photo film support face 29 confronted with an exposure aperture. The bottom of the rear cover 14 has lids 30 and 31 for enclosing respective bottoms of the cassette containing chamber 17 and the roll chamber 19. The bottom lids 30 and 31 are a so-called pull-top type. The bottom lids 30 and 31 are formed integrally with the rear cover 14 from resin. The bottom lids 30 and 31 have retaining hooks, which are engaged with retaining hooks formed on the inside of the front cover 13, so that the bottoms of the chambers 17 and 19 have a closed position in light-tight fashion. Reference numerals 32 and 33 designate the retaining hooks formed on the bottom lid 30.

The bottom lid 30 is openable for removing the cassette 16 containing the photo film 18 as exposed. A stopper projection 34 circular as viewed in cross section is formed on the bottom lid 30 and projected to the inside of the cassette containing chamber 17. The stopper projection 34 is only contacted on a circular face inside a key hole formed in the spool 22, and not on its keyed portion. The spool 22 is allowed to rotate by the stopper projection 34, which also keeps the spool 22 positioned axially. Also the stopper projection 34, when the bottom lid 30 is open, contacts the cassette 16, and prevents the cassette 16 from dropping out of the cassette containing chamber 17.

The exposure-taking unit 12 includes a photo film counter mechanism, a one-frame advance mechanism, a shutter mechanism, a taking lens 35, a viewfinder optical system 36 and the like, which are disposed outside the light-shielding tunnel 21. It is possible that the light-shielding tunnel 21 is split into a front part and a rear part, that the front part is formed with the photo film containing unit 11, and that the rear part is provided with the photo film counter mechanism among others as a single exposure-taking unit, which may be secured to the front part in removable fashion. The viewfinder 36 is disposed between the viewfinder objective window 27 in the front cover 13 and an eyepiece window 14a formed in the rear cover 14. Note that the viewfinder 36 may be mounted on the front cover 13, not mounted on the exposure-taking unit 12.

Figure 2:
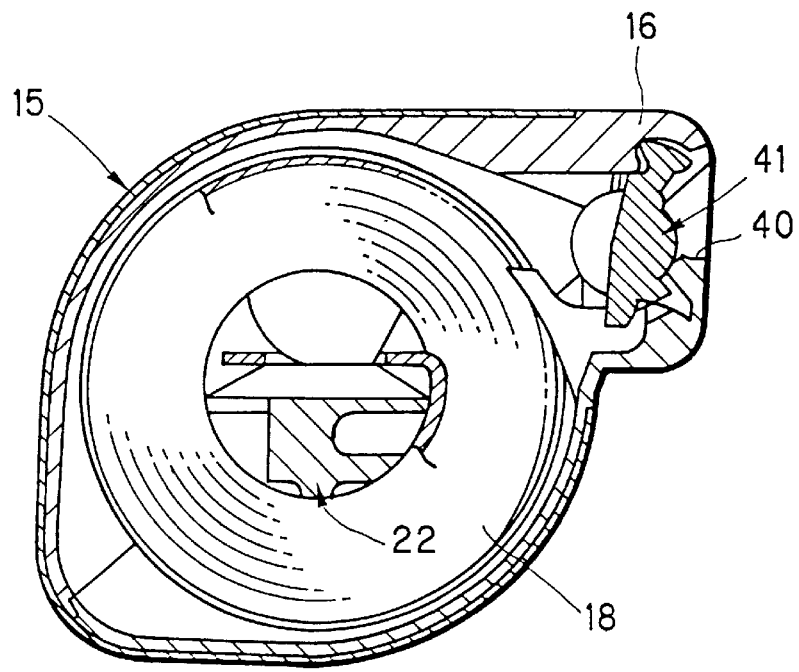
FIG. 2 is a cross section illustrating a photo film cassette with the cassette shutter closed.
Figure 3:
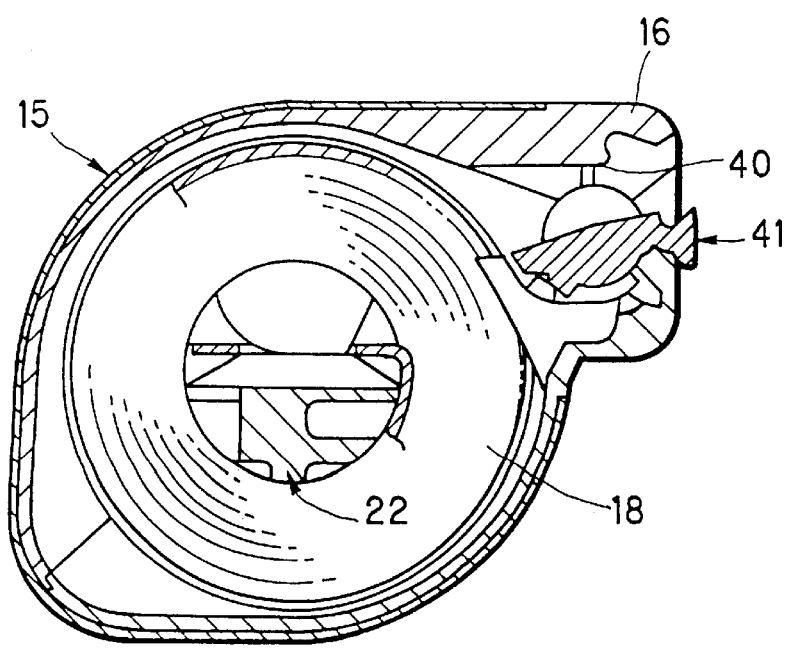
FIG. 3 is a cross section illustrating the photo film cassette with the cassette shutter open.
Figure 4:
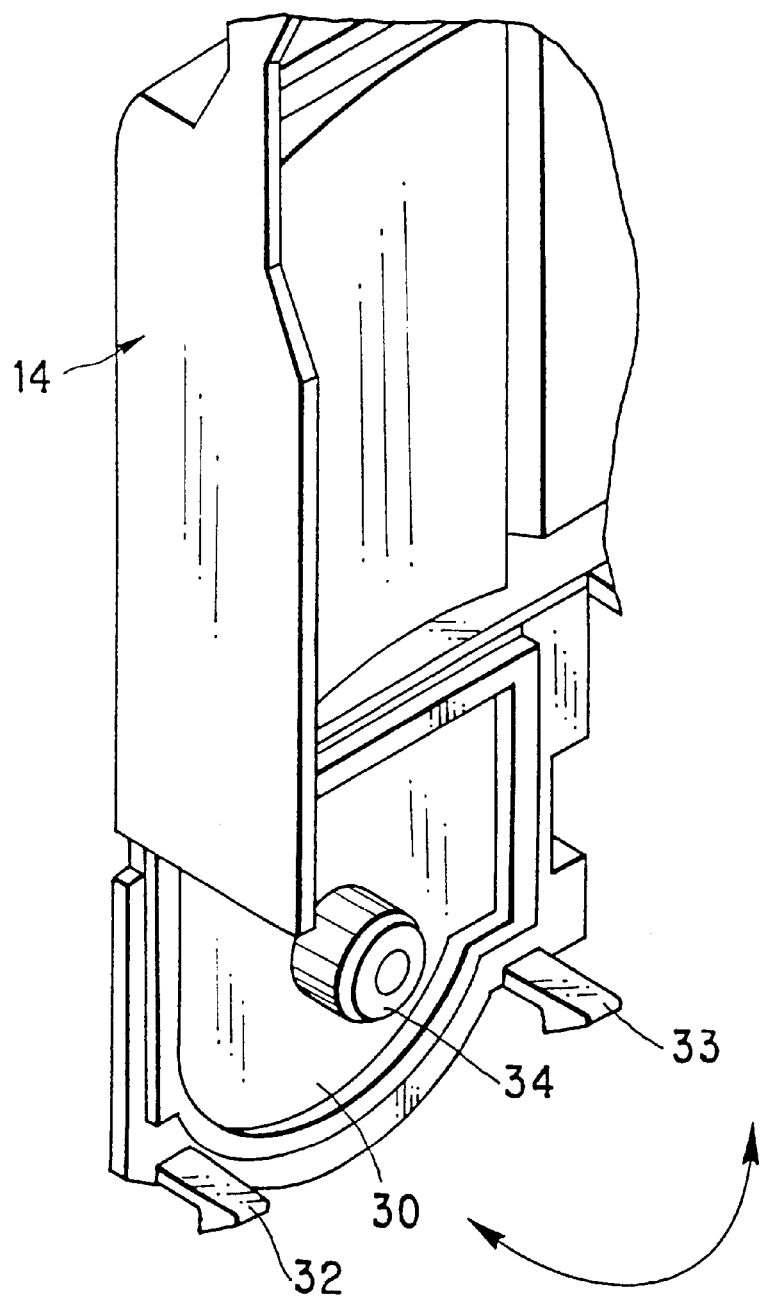
FIG. 4 is a perspective illustrating a cassette shutter drive mechanism.

FIGS. 2 and 3 are sections illustrating the cassette 16. A photo film passage port 40 has a cassette shutter plate 41, which is rotatable between an open position of FIG. 3 and a closed position of FIG. 2 for avoiding entry of ambient light into the cassette 16. A distal end of the cassette shutter 41 has a C-shaped groove, which emerges through a face of the cassette 16.

Between the cassette containing chamber 17 and the exposure-taking unit 12, there is incorporated a cassette shutter drive mechanism (not shown), which opens/closes the cassette shutter 41 of the cassette 16.

Operation of the above construction is described now. In the cassette containing chamber 17 of the lens-fitted photo film unit 10 in FIG. 5, an upper key hole 22a of the spool 22 is engaged with a shaft portion 23a of the winding wheel 23. A lower key hole (axial hole) 22b is engaged with the stopper projection 34 of the bottom lid 30. The stopper projection 34 is only contacted on the circular face inside the lower key hole (axial hole) 22b, and not on its keyed portion. The spool 22 is allowed to rotate by the stopper projection 34, which also keeps the spool 22 positioned axially. It is possible to avoid raising the rotational load of the winding wheel 23 in unwanted fashion.

The bottom lid 30 is closed. In the cassette containing chamber 17, the cassette shutter 41 of the cassette 16 is kept open.

For taking a photograph, the winding wheel 23 is rotated in a winding direction. The photo film 18 is advanced. Upon one-frame advancement, the one-frame advance mechanism is operated to inhibit the photo film 18 from advancing and the winding wheel 23 from rotating. The shutter mechanism is charged. The shutter release button 28 is depressed to actuate the shutter mechanism. Light from an object to be photographed is passed through the taking lens 35 and the light-shielding tunnel 21, and comes incident upon the photo film 18 set at the exposure aperture, to take an exposure.

The photo film 18 as exposed is wound on to the spool 22 of the cassette 16 by winding operation. After taking a final exposure, the photo film 18 is wound entirely into the cassette 16. A photographer submits the lens-fitted photo film unit 10 after exposure to a photo laboratory.

In a photo laboratory, the cassette 16 having contained the photo film 18 as exposed is removed from the lens-fitted photo film unit 10. The hooks of the bottom lid 30 at the bottom of the lens-fitted photo film unit 10 are disengaged, before the bottom lid 30 is opened. The cassette 16 emerges externally, and then is pulled out in the longitudinal direction along the spool 22. The cassette shutter 41 is in the closed position. The photo film 18 inside the cassette 16 is shielded from ambient light.

Figure 6:
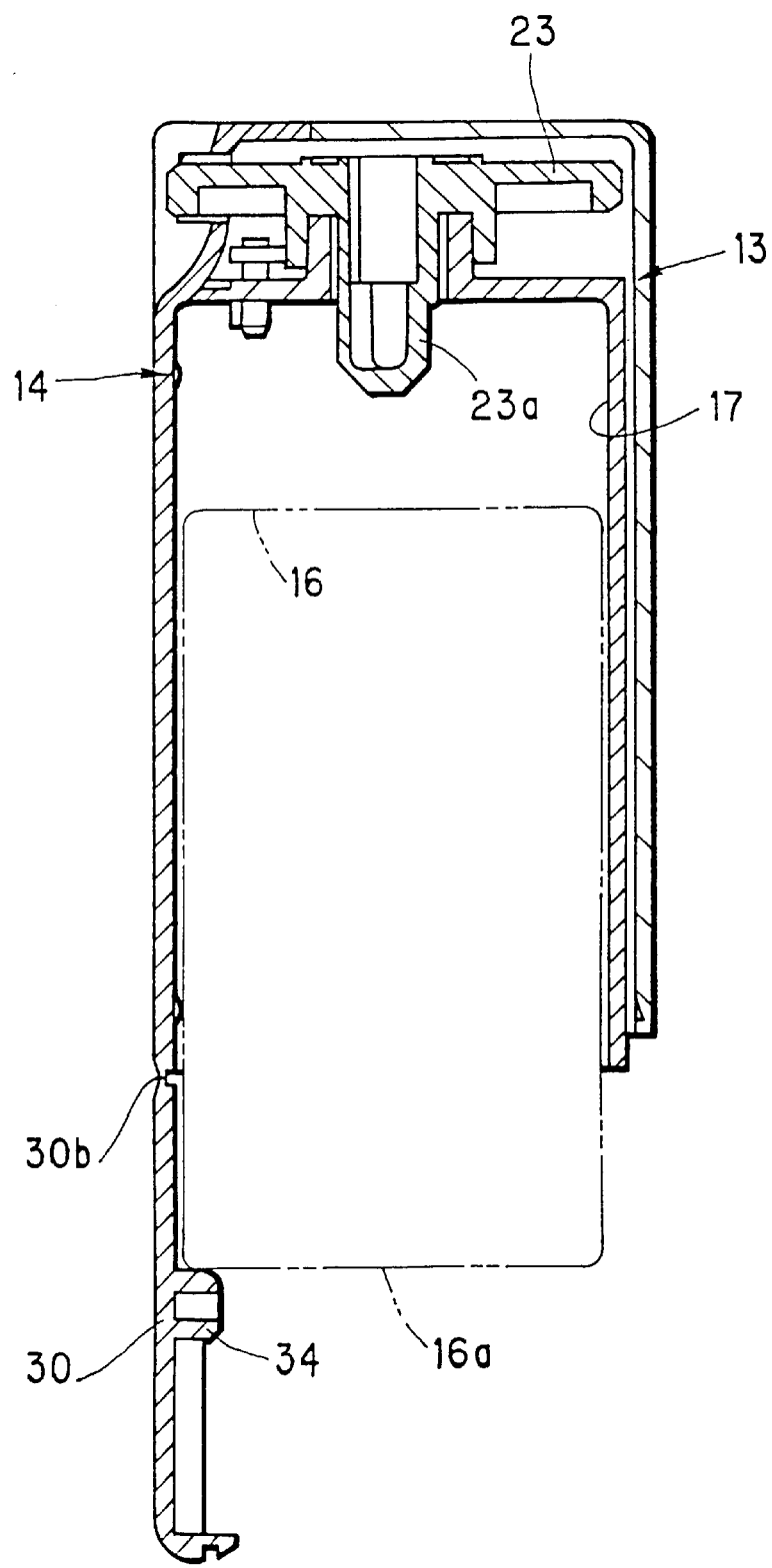
FIG. 6 is a vertical section illustrating the cassette containing chamber with the bottom lid open.

It is impossible easily to remove the cassette 16 even when the bottom lid 30 is open, because the upper key hole 22a in the spool 22 is still engaged with the shaft portion 23a of the winding wheel 23, and the C-groove in the cassette shutter 41 is engaged with the drive mechanism. An operator of the photo laboratory manually shakes down the lens-fitted photo film unit 10 in an axial direction of the spool 22. In the prior art, the cassette 16 would be forcibly dropped down away from the cassette containing chamber 17, possibly striking the cassette 16 against a wall or a floor, and damaging the cassette 16. However in the present invention, the bottom lid 30 has the stopper projection 34. In FIG. 6, a bottom face 16a contracts and is received by the stopper projection 34 in the course of the removal, to avoid dropping the cassette 16 forcibly.

The present embodiment has a hinge portion 30b which has the small thickness and connecting the bottom lid 30 to the rear cover 14 as one piece of resin. After shipment from a factory where the lens-fitted photo film unit has been manufactured, the bottom lid 30 stands for a long time with the cassette containing chamber 17 closed. There is plastic deformation of the hinge portion 30b with time, so that the bottom lid 30 even when opened tends to move back toward the closed position. Should the bottom lid 30 be connected by a mechanical hinge to the rear cover 14, the bottom lid 30 would have no tendency of moving back toward the closed position. There would be no reliability of contact of the stopper projection 34 with the cassette 16 when the bottom lid 30 is open. In contrast, the stopper projection 34 in the present invention can be contacted on the cassette 16 when the bottom lid 30 is open, because the bottom lid 30 has a tendency to return to the closed position.

The stopper projection 34 performs the two operations of cassette stopping and spool positioning. The present invention is applicable to a stopper projection without the spool positioning. The bottom lid 30 is formed integrally with the rear cover 14. Alternatively a bottom lid may be formed integrally with the cassette containing chamber 17 or the front cover 13. It is still necessary to use openable retaining hooks or the like in view of opening the bottom lid in manual external operation.

Figure 7:
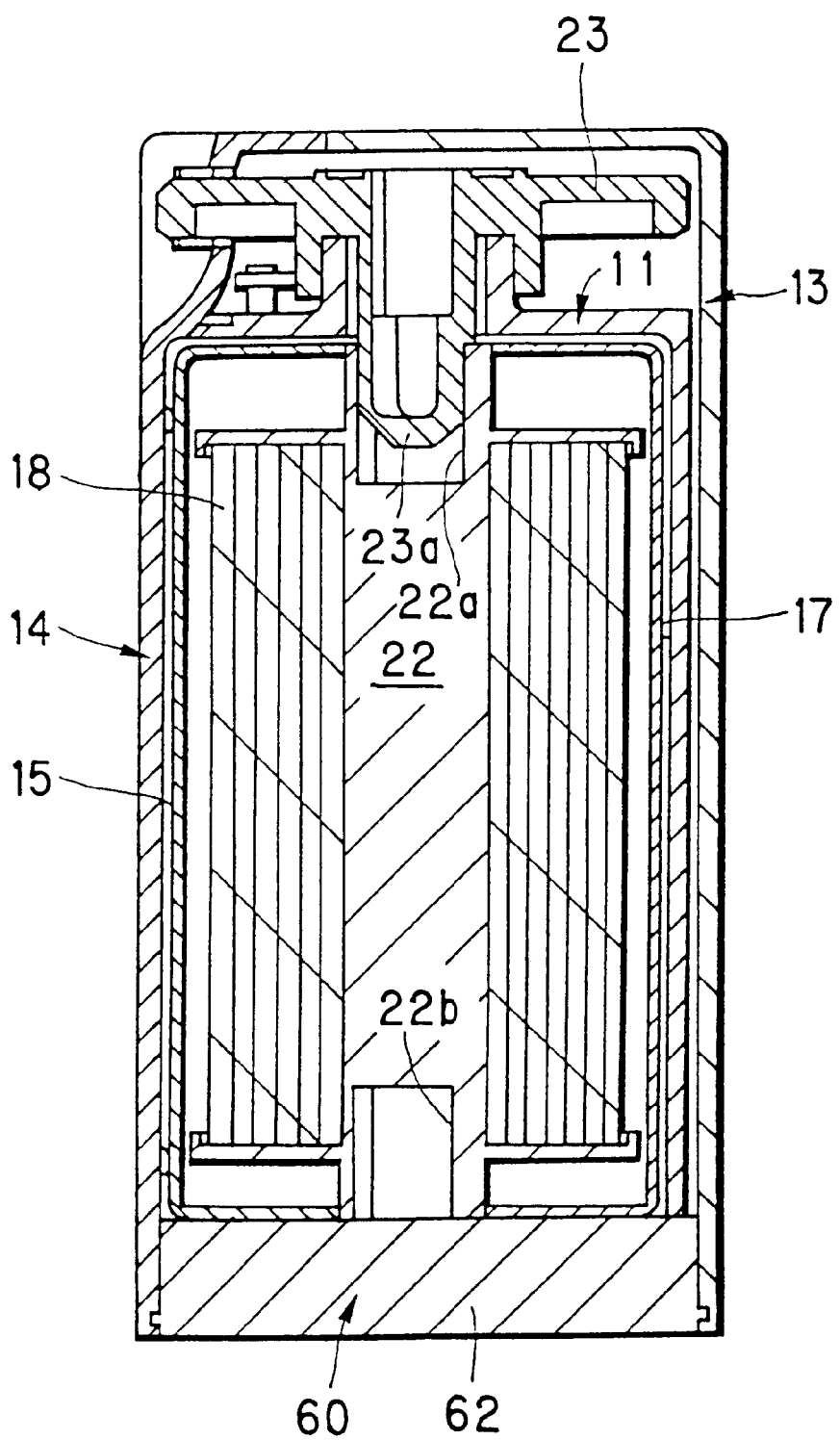
FIG. 7 is a vertical section illustrating another preferred cassette containing chamber with the bottom lid closed.
Figure 8:
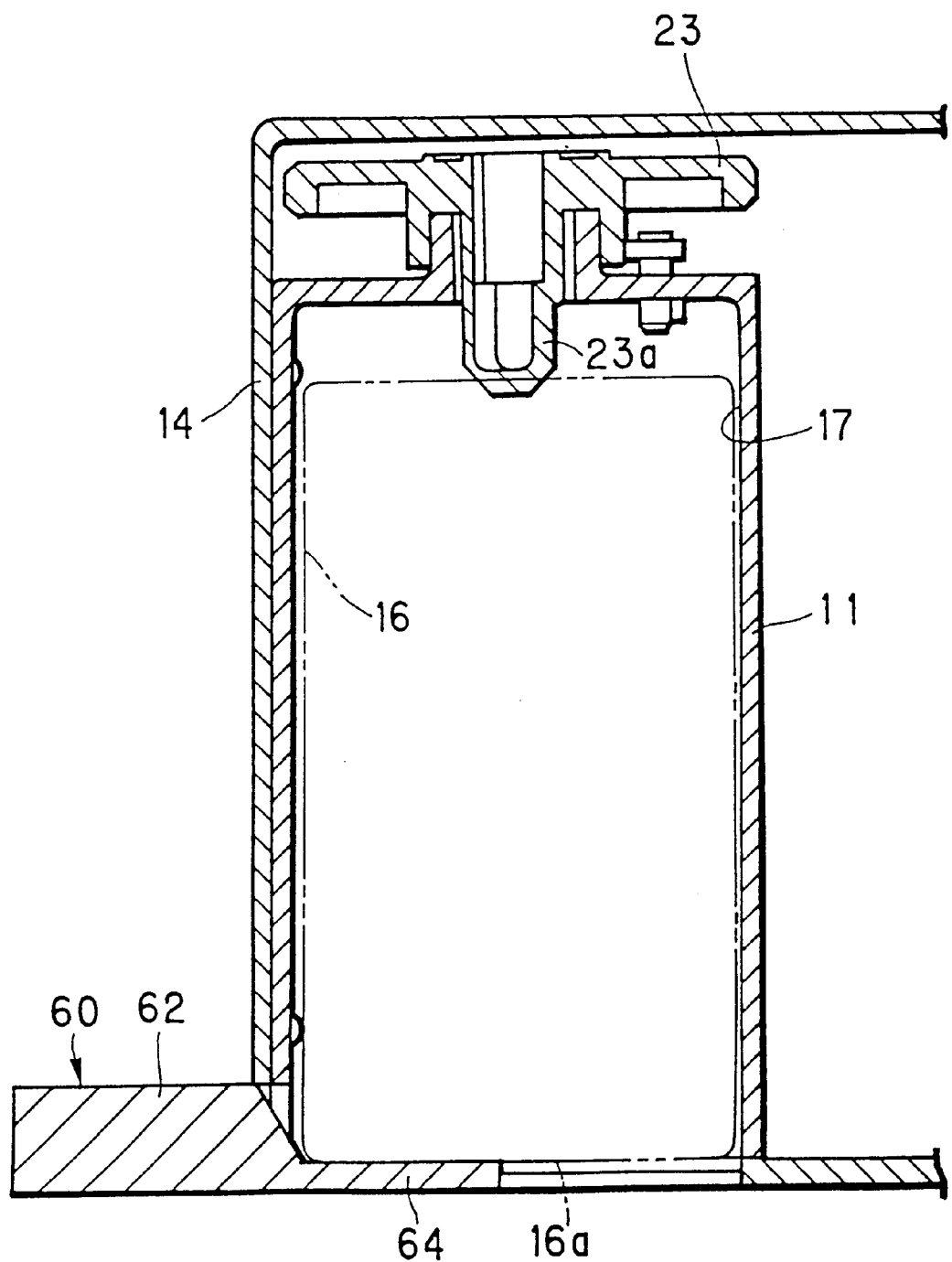
FIG. 8 is a section illustrating the cassette containing chamber with the bottom lid open.

In the above embodiment, the bottom lids are swung open about the respective hinge portions. The present invention is applicable to a slidable lid 60 as illustrated in FIGS. 7 and 8. The bottom lid 60 can be formed from resin or any other material. The bottom lid 60 includes a support portion 62 and a retracted portion 64. The support portion 62 supports the cassette 16 inside the cassette containing chamber 17. The retracted portion 64 has a level under the support portion 62. When the bottom lid 60 is slid to move the support portion 62 away from the cassette 16, the retracted portion 64 is confronted with the cassette 16. The lens-fitted photo film unit 10 is shaken manually or automatically by external operation, to disengage the shaft portion 23a from the spool 22. In FIG. 8, the cassette 16 is contacted on the retracted portion 64. The bottom face 16a of the cassette 16 emerges out of the cassette containing chamber 17. The cassette 16 is kept from dropping. Then the bottom lid 60 is further slid to open fully. The cassette 16 is removed from the cassette containing chamber 17.

In spite of the above embodiments, there remains a problem in strength of the hinge portion 30b. As illustrated in FIG. 12A, a hinge portion 110 has a reverse face 110a in which a groove 112 is formed. The groove 112 is adapted to reduction of thickness of the hinge portion 110, for facilitating bend of the hinge portion 110. When the hinge portion 110 is bent rectangularly, a corner 110b is formed as illustrated in FIG. 12B, and has a curvature αR, for example, 0.5 R.

It is preferred commercially to form a body contour of a lens-fitted photo film unit smoothly and neatly. It could be conceived that the hinge portion 110 has an obverse face 110b in which a wedge-shaped groove 113 is formed in a wedge shape as viewed in cross section of FIG. 13A. Namely the wedge-shaped groove 113 has a sharp bottom and two slowly curved faces connected to the flat portion. When bent rectangularly, a corner 110b is formed as illustrated in FIG. 13B, and has a curvature βR which is greater than αR.

However the forming of the wedge-shaped groove 113 in the hinge portion 110 makes it easy to crack the hinge portion 110 along the wedge-shaped groove 113. The strength of the hinge portion 110 is remarkably lowered.

Figure 9:
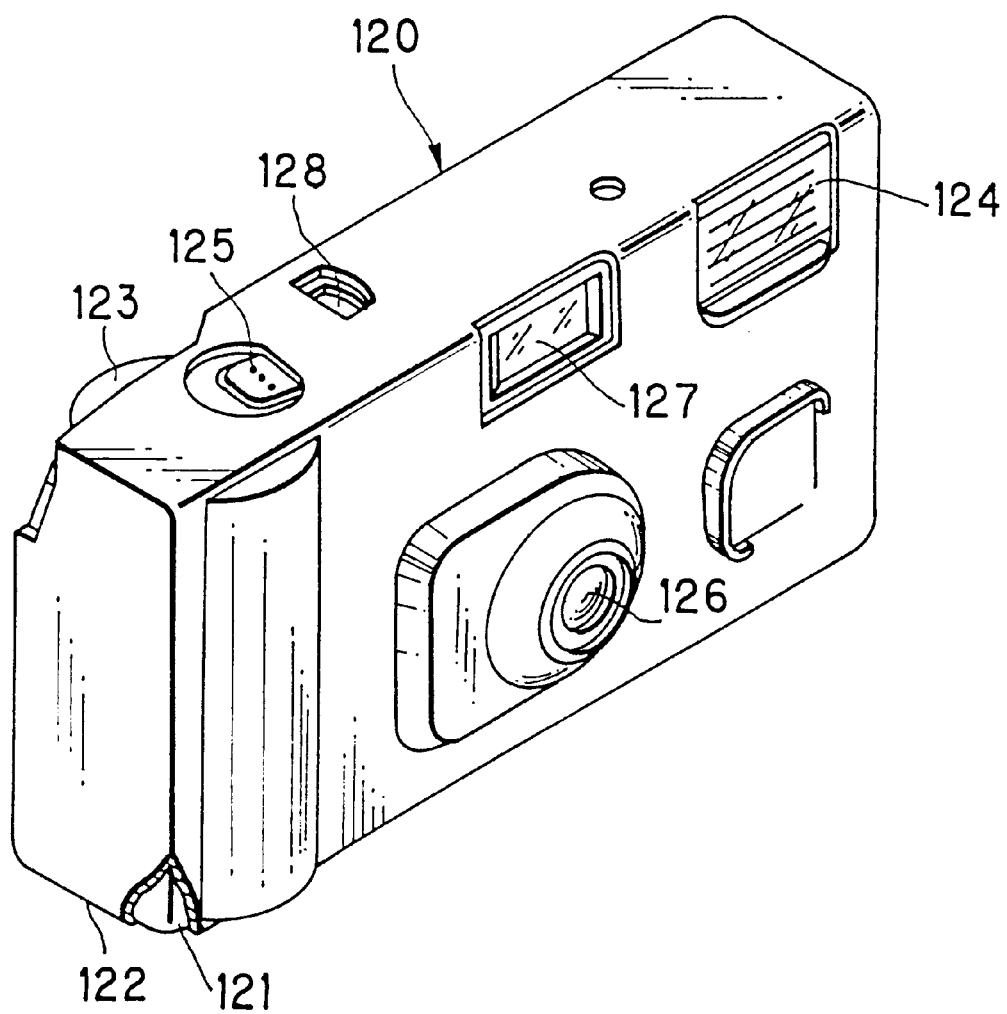
FIG. 9 is a perspective illustrating another preferred lens-fitted photo film unit.

A preferred embodiment for raising strength of a hinge portion is described next. In FIG. 9, a lens-fitted photo film unit 120 includes a photo film housing 121 and a cardboard wrapper 122. Through the cardboard wrapper 122 appears winding wheel 123, a flash device 124 and a shutter release button 125. The cardboard wrapper 122 has openings through which a taking lens 126, a viewfinder 127 and a frame counter wheel 128 emerge.

The photo film housing 121 in FIG. 10 has a photo film roll chamber 131 and a cassette containing chamber 133. The roll chamber 131 contains a roll of photo film 130. The cassette containing chamber 133 contains a cassette 132. The photo film housing 121 includes a main body 134, a front cover 135 and a rear cover 138. The main body 134 incorporates an exposure-taking mechanism. The front cover 135 covers a front of the main body 134. The rear cover 138 covers the rear of the main body 134. A bottom lid 136 is formed with the rear cover 138 via a hinge portion 141, and covers a bottom of the roll chamber 131. A bottom lid 137 is formed with the rear cover 138 via a hinge portion 142, and covers a bottom of the cassette containing chamber 133.

The hinge portions 141 and 142 have an identical shape. Only the hinge portion 142 is hereinafter referred to. The hinge portion 142 includes an obverse face 144 and a reverse face 145. A first groove 146 is formed in the obverse face 144. A second groove 147 is formed in the reverse face 145. As viewed in cross section, the grooves 146 and 147 respectively have a trapezoidal shape, and respective centers P and Q, which are defined at an interval D in the width direction of the grooves 146 and 147. The two laterals between the bottom of the first groove 146 and flat portions of the obverse face 144 are formed as slowly curved faces. The reverse face 145 has a receiving flat face 148 and a regulating projection or ridge 149, which are contacted together to position the bottom lid 137 at a right angle relative to the rear cover 138 when the bottom lid 137 is closed.

Figure 11A:
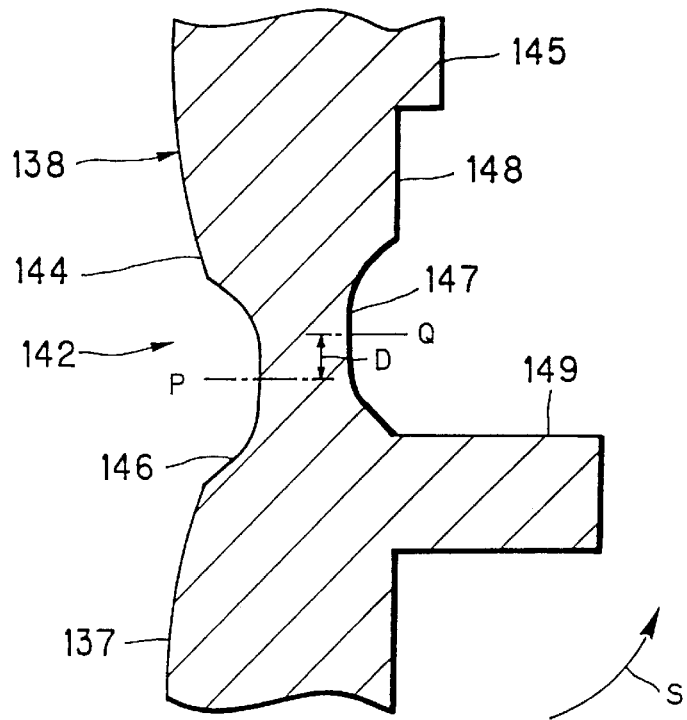
FIG. 11A is a partial section illustrating a hinge portion of a bottom lid as molded.
Figure 11B:
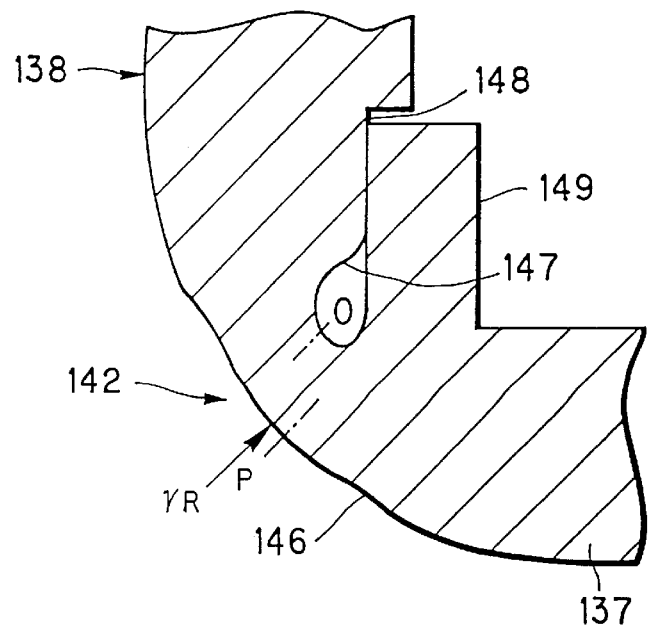
FIG. 11B is a partial section illustrating the hinge portion after bending the bottom lid.

When the bottom lid 137 is rotated in a closing direction of an arrow S, the first groove 146 is extended and the second groove 147 is compressed as illustrated in FIG. 11B. The regulating projection 149 is contacted on the receiving flat face 148 to define the right angle between the bottom lid 137 and the rear cover 138. The first groove 146 has the center P at which the first groove 146 is bent. The second groove 147 has the center Q at which the second groove 147 is bent and which is different from the center P. The hinge portion 142 can have a more slowly curved corner having a curvature γR than a hinge portion in which the center Q would be coincident with the center P. Accordingly load of the bending is spread in the hinge portion 142, which is sufficiently strong and resistant to many opening/closing operations. Note that the obverse of the hinge portion 142 as bent has appearance of the first groove 146, but to an inconspicuous extent without any problem.

Although the present invention has been fully described by way of the preferred embodiments thereof with reference to the accompanying drawings, various changes and modifications will be apparent to those having skill in this field. Therefore, unless otherwise changes and modifications depart from the scope of the present invention, they should be construed as included therein.

What is claimed is:

1. A lens-fitted photo film unit comprising:

a body;

an exposure taking mechanism;

a cassette chamber disposed within the body;

a cassette disposed within the cassette chamber, the cassette containing photo film;

a spool rotatably disposed within the cassette, an end of the photo film being attached to the spool;

a bottom lid swingably attached to the body, the bottom lid covering a bottom of the cassette chamber in a lightproof fashion when the bottom lid is in a closed position, the bottom lid allowing the cassette to emerge from the cassette chamber when the bottom lid is in an open position;

an axial hole disposed in an end of the spool nearest the bottom lid; and a stopper device disposed upon the bottom lid, the stopper device extending away from an inner surface of the bottom lid;

a winding wheel rotatable by external operation, the winding wheel being disposed over the cassette chamber, the winding wheel being adapted to advance the photo film;

a key groove formed in an end of the spool nearest the winding wheel; and a shaft portion projecting from the winding wheel, the shaft portion being adapted to engage with the key groove;

wherein the stopper device is positioned such that when the bottom lid is opened to a position perpendicular to the closed position the cassette is prevented from emerging from the cassette chamber past a partially seated position due to contact between the cassette and the stopper device, and wherein the shaft portion transmits rotation of the winding wheel to the spool, and the shaft portion is disengaged from the spool when the cassette is in the partially seated position.

2. A lens-fitted photo film unit comprising:

a body;

an exposure taking mechanism;

a cassette chamber disposed within the body;

a cassette disposed within the cassette chamber, the cassette containing photo film;

a bottom lid slidably attached to the body, the bottom lid covering a bottom of the cassette chamber in a lightproof fashion when the bottom lid is in a closed position, the bottom lid allowing the cassette to emerge from the cassette chamber when the bottom lid is in a fully open position, the bottom lid allowing the cassette to be in a partially seated position in the cassette chamber when the bottom lid is in a partially open position, the bottom lid comprising:

a first planar support surface for contacting substantially all of a bottom of the cassette when the bottom lid is in the closed position;

a second planar support surface for contacting a portion of the bottom of the cassette when the bottom lid is in the partially open position and the cassette is in the partially seated position; and a sloping surface between and connecting said first and second support surfaces for urging the cassette from the partially seated position to a seated position when said bottom lid is moved from the partially open position to the closed position.

* * * * *